US009942221B2

(12) United States Patent
Valecha

(10) Patent No.: US 9,942,221 B2
(45) Date of Patent: *Apr. 10, 2018

(54) AUTHENTICATION FOR BLOCKING SHOULDER SURFING ATTACKS

(71) Applicant: International Business Machines Corporation, Armonk, NY (US)

(72) Inventor: Vinod A. Valecha, Pune (IN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/212,376

(22) Filed: Jul. 18, 2016

(65) Prior Publication Data

US 2018/0019992 A1   Jan. 18, 2018

(51) Int. Cl.
*H04L 29/06* (2006.01)

(52) U.S. Cl.
CPC .......... *H04L 63/083* (2013.01); *H04L 63/102* (2013.01)

(58) Field of Classification Search
CPC ....... G06F 21/36; H04L 63/10; H04L 63/083; H04L 63/102
See application file for complete search history.

(56) References Cited

U.S. PATENT DOCUMENTS

| 7,616,764 | B2 | 11/2009 | Varghese et al. | |
|---|---|---|---|---|
| 9,160,744 | B1* | 10/2015 | Machani | H04L 63/0428 |
| 9,311,472 | B2* | 4/2016 | Nguyen | G06F 21/36 |
| 2004/0230843 | A1* | 11/2004 | Jansen | G06F 21/36 726/7 |
| 2008/0052523 | A1* | 2/2008 | Kaluza | H04L 9/06 713/183 |
| 2008/0086644 | A1* | 4/2008 | Beck | G06F 21/31 713/183 |

(Continued)

FOREIGN PATENT DOCUMENTS

KR   1020090007936 A   1/2009

OTHER PUBLICATIONS

Pierson, Bernadette A., "Portfolio Focus Areas", w3 IBM Connections, Council for Innovation Leadership Wiki, <https://w3-connections.ibm.com/wikis/home?lang=en-us#!/wiki/W82dbe7d5ec27_401c_b4df_fea45264235a/page/Portfolio%20Focus%20Areas>, Updated Feb. 16, 2 pages.

(Continued)

*Primary Examiner* — Matthew Smithers
(74) *Attorney, Agent, or Firm* — Gilbert Harmon, Jr.

(57) ABSTRACT

An approach to authenticating a user for resource access. The approach displays independently bi-directionally rotating concentric layers wherein each of the concentric layers are divided into segments and each segment contains a symbol. The approach then allows the user to independently rotate each of the concentric layers until a desired symbol is positioned in a predetermined user specified validation section, i.e., an alignment of segments across the totality of the concentric layers. The approach then generates a password based on concatenating the symbols associated with the segments aligned in the validation section in an order predetermined by the user. The approach then submits the generated password for validation against a user predetermined password locally on a client computer or remotely on a server computer.

20 Claims, 5 Drawing Sheets

(56) References Cited

U.S. PATENT DOCUMENTS

| | | | | |
|---|---|---|---|---|
| 2009/0172810 A1* | 7/2009 | Won | ............... | G06F 21/36 |
| | | | | 726/19 |
| 2010/0073126 A1* | 3/2010 | Morin | ............... | G06F 21/36 |
| | | | | 340/5.2 |
| 2011/0055585 A1* | 3/2011 | Lee | ............... | H04L 9/0844 |
| | | | | 713/183 |
| 2012/0082306 A1* | 4/2012 | Hulse | ............... | H04L 9/36 |
| | | | | 380/28 |
| 2012/0272311 A1* | 10/2012 | Althammer | ............... | G06F 21/36 |
| | | | | 726/16 |
| 2013/0340057 A1* | 12/2013 | Kitlyar | ............... | G06F 21/36 |
| | | | | 726/6 |
| 2014/0068754 A1* | 3/2014 | Burkill | ............... | G06F 21/36 |
| | | | | 726/18 |
| 2014/0157382 A1* | 6/2014 | Ford | ............... | H04L 63/08 |
| | | | | 726/7 |
| 2014/0344923 A1* | 11/2014 | Wang | ............... | G06F 21/36 |
| | | | | 726/19 |
| 2014/0351760 A1* | 11/2014 | Skory | ............... | G06F 3/0485 |
| | | | | 715/830 |
| 2015/0235024 A1* | 8/2015 | Corrion | ............... | G06F 21/56 |
| | | | | 726/18 |

OTHER PUBLICATIONS

Valecha, Vinod A., "Authentication for Blocking Shoulder Surfing Attacks", U.S. Appl. No. 15/416,396, filed Jan. 26, 2017, 24 pages.
IBM Appendix P, list of patents or patent applications treated as related, Jan. 26, 2017, 2 pages.

* cited by examiner

AUTHENTICATION FOR BLOCKING SHOULDER SURFING ATTACKS

BACKGROUND OF THE INVENTION

The present invention relates generally to computer security and more specifically, to security techniques for blocking shoulder surfing attacks.

Security support associated with information and computer access has been based largely on passwords, which are the principle part of the authentication process. The most common computer authentication method uses an alphanumeric username and password, which has significant drawbacks such as key logging for subsequent retrieval. Efforts to overcome the vulnerability of traditional methods, such as visual or graphical password schemes, were developed as possible alternative solutions to a text based scheme. A drawback to graphical password schemes is that they are more vulnerable to "shoulder surfing" than conventional alphanumeric text passwords. When users input their passwords in a public place, they can be at risk of attackers stealing their password. An attacker can capture a password by direct observation over the shoulder. This tactic, referred to as "shoulder surfing," is a known risk and of special concern when authenticating in public places or common areas.

SUMMARY

According to an embodiment of the present invention, a computer-implemented method for authenticating a user for resource access, the method comprising: displaying, by an authentication component, a plurality of independently bi-directionally rotating concentric layers configured with a plurality of segments wherein each of the plurality of segments contain a symbol; rotating, by the authentication component, based on user input, each of the plurality of concentric layers until a preconfigured symbol is aligned with a predetermined validation section; generating, by the authentication component, a password based on symbols aligned with the validation section; authenticating, by the authentication component, the generated password based on matching the generated password to a predetermined password; and granting, by the authentication component, access to a resource associated with the predetermined password.

According to another embodiment of the present invention, a computer program product for authenticating a user for resource access, the computer program product comprising: one or more non-transitory computer readable storage media and program instructions stored on the one or more non-transitory computer readable storage media, the program instructions comprising: program instructions to display, by an authentication component, a plurality of independently bi-directionally rotating concentric layers configured with a plurality of segments wherein each of the plurality of segments contain a symbol; program instructions to rotate, by the authentication component, based on user input, each of the plurality of concentric layers until a preconfigured symbol is aligned with a predetermined validation section; program instructions to generate, by the authentication component, a password based on symbols aligned with the validation section; program instructions to authenticate, by the authentication component, the generated password based on matching the generated password to a predetermined password; and program instructions to grant, by the authentication component, access to a resource associated with the predetermined password.

According to another embodiment of the present invention, A computer system for creating a disruption indicator based on communication feeds, the computer system comprising: one or more computer processors; one or more non-transitory computer readable storage media; program instructions stored on the one or more non-transitory computer readable storage media for execution by at least one of the one or more computer processors, the program instructions comprising: program instructions to display, by an authentication component, a plurality of independently bi-directionally rotating concentric layers configured with a plurality of segments wherein each of the plurality of segments contain a symbol; program instructions to rotate, by the authentication component, based on user input, each of the plurality of concentric layers until a preconfigured symbol is aligned with a predetermined validation section; program instructions to generate, by the authentication component, a password based on symbols aligned with the validation section; program instructions to authenticate, by the authentication component, the generated password based on matching the generated password to a predetermined password; and program instructions to grant, by the authentication component, access to a resource associated with the predetermined password.

DETAILED DESCRIPTION

The embodiments depicted and described herein recognize the need for a secure system for entering and validating passwords. Further, these systems should be available for use in public places without compromising security credentials. The embodiments depicted and described herein recognize the benefits of generating a password based on segmented multi-layer authentication. The embodiments described herein are configurable for parameters such as, but not limited to, password length, number of layers, validation section, etc. Further, the embodiments allow a user to enter a password in a public place without concern of others observing the password from a vantage point allowing observation of the password entry.

The embodiments provide the capability for an individual to prove to an authentication system that the individual knows secret information without revealing the secret information to interloping observers during the process of proof. In this regard, the embodiments relieve the individual of the task of shielding password entry from unwanted observation.

In describing embodiments in detail with reference to the figures, it should be noted that references in the specification to "an embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, describing a particular feature, structure or characteristic in connection with an embodiment, one skilled in the art has the knowledge to affect such feature, structure or characteristic in connection with other embodiments whether or not explicitly described.

Figure 1:
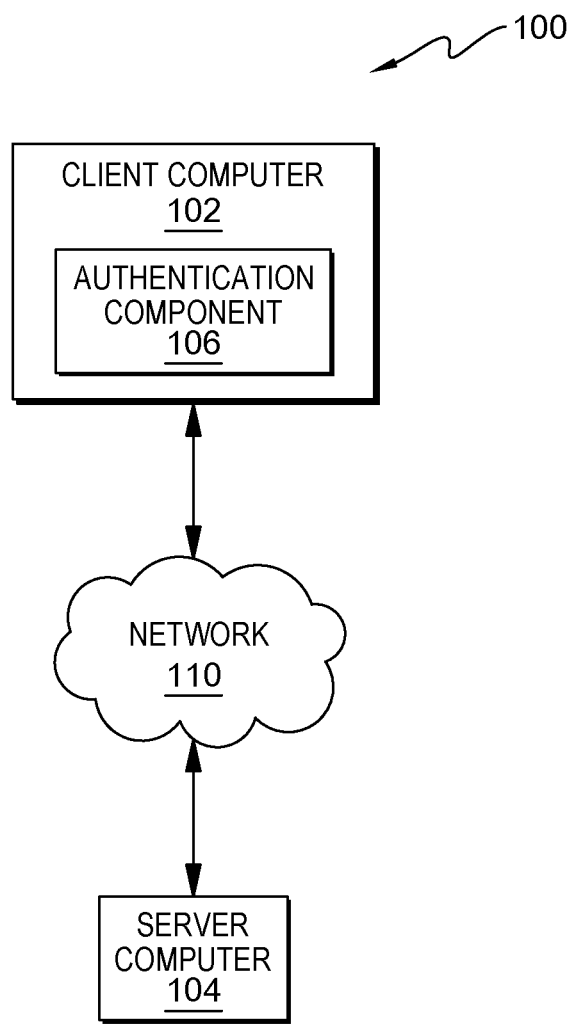
FIG. 1 is a functional block diagram generally depicting an authentication environment, in accordance with an embodiment of the present invention.

FIG. 1 is a functional block diagram illustrating, generally, an embodiment of a segmented multi-layer authentication environment 100. The segmented multi-layer authentication environment 100 comprises an authentication component 106 operational on a client computer 102, a server computer 104 and a network 110 supporting communications between the client computer 102 and the server computer 104.

Client computer 102 can be a standalone computing device, management server, a web server, a mobile computing device, or any other electronic device or computing system capable of receiving, sending, and processing data. In other embodiments, client computer 102 can represent a server computing system utilizing multiple computers as a server system. In another embodiment, client computer 102 can be a laptop computer, a tablet computer, a netbook computer, a personal computer, a desktop computer or any programmable electronic device capable of communicating with other computing devices (not shown) within segmented multi-layer authentication environment 100 via network 110.

In another embodiment, client computer 102 represents a computing system utilizing clustered computers and components (e.g., database server computers, application server computers, etc.) that act as a single pool of seamless resources when accessed within segmented multi-layer authentication environment 100. Client computer 102 can include internal and external hardware components, as depicted and described in further detail with respect to FIG. 4.

Authentication component 106 can be a framework for generating a password based on aligning layers with respect to a preselected segment of a segmented multi-layer authentication environment 100 embodiment. It should be noted in the embodiment that there can be one concentric layer for each symbol of the password. Embodiments of the framework provide a unique mechanism for authenticating a user using a disc-based authentication that frustrates shoulder surfing attacks. Further, the embodiments preserve the primary authentication's user-friendly nature and eliminates the need to store a graphical database on a server including the communications overhead of transferring images across a network.

Network 110 can be, for example, a local area network (LAN), a wide area network (WAN) such as the Internet, or a combination of the two, and can include wired, wireless, or fiber optic connections. In general, network 110 can be any combination of connections and protocols that will support communications between client computer 102 and server computer 104.

Server computer 104 can be a standalone computing device, management server, a web server, a mobile computing device, or any other electronic device or computing system capable of receiving, sending, and processing data. In other embodiments, server computer 104 can represent a server computing system utilizing multiple computers as a server system. In another embodiment, server computer 104 can be a laptop computer, a tablet computer, a netbook computer, a personal computer, a desktop computer, or any programmable electronic device capable of communicating with other computing devices (not shown) within segmented multi-layer authentication environment 100 via network 110.

In another embodiment, server computer 104 represents a computing system utilizing clustered computers and components (e.g., database server computers, application server computers, etc.) that act as a single pool of seamless resources when accessed within segmented multi-layer authentication environment 100. Server computer 104 can include internal and external hardware components, as depicted and described in further detail with respect to FIG. 4.

Figure 2:
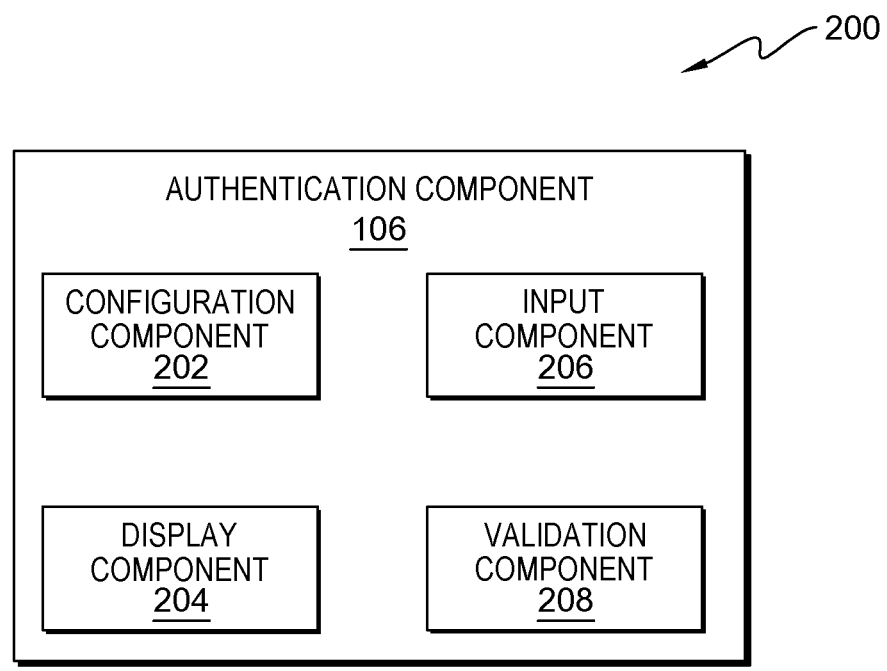
FIG. 2 is a functional block diagram depicting an authentication component, in accordance with an embodiment of the present invention.

FIG. 2 is a functional block diagram 200 depicting authentication component 106 comprising configuration component 202, display component 204, input component 206 and validation component 208.

Configuration component 202 of an embodiment of the present invention provides the capability to configure the number of layers of a disc, the number of segments of a layer and the symbol associated with a segment. It should be noted that a disc can be divided into a plurality of concentric layers and each concentric layer can be divided into a plurality of segments. Further, each segment can contain a symbol. The symbols can be, but are not limited to, letters (both upper and lower case), numbers, pictures, pictographs, punctuation or any other representation. It should be noted that some of the segments can remain empty and empty segments as well as segments containing symbols can be used to construct a password. Each concentric layer can have the same or a different number of segments and can have the same or different symbols in the segments. A collection of aligned segments crossing the plurality of concentric layers are defined as a section wherein a section would represent a pie-shaped slice of the disc.

Display component 204 of an embodiment of the present invention either provides the capability to generate a visual representation of a configured disc or is a configured disc. Further, the display component provides the capability to allow the user to individually rotate the concentric layers in different directions, e.g., clockwise or counter-clockwise, to align a selected segment of each concentric layer with a selected section as the technique of specifying a password.

Display component 204 will seed segments with the preconfigured password symbols and will randomly distribute the remaining symbols to open segments until all the symbols have been assigned each time a user desires to generate a password for access validation. In this manner an interloping onlooker cannot memorize inappropriate sections for a later attempt to defeat the security.

Input component 206 provides the capability to allow the user to select a desired concentric layer and rotate a desired segment of the concentric layer to a desired section. Each concentric layer can be manipulated to generate a password based on the segments aligned with the desired section. It should be noted that the desired section can be predetermined or can change when a password is generated. For example, 12 concentric layers can be configured representing the hours on a clock and the selected section can be the section corresponding to the current hour of the day. In this example if it was 3:25 pm then the desired segments for the password would be aligned with section 3 on the disk.

Validation component 208 provides the capability to generate a password and submit the generated password for validation. It should be noted in the embodiment that validation and authentication can be used interchangeably. The embodiment generates the password by ordering the symbols in each segment, aligned with the appropriate section, according to the configuration and validates the generated password by comparing the generated symbol string with the preconfigured password. It should be noted that access to the resource is granted if the generated password matches the preconfigured password. The password is generated based on a user initiated action such as, but not limited to, clicking on a button, expiration of a predetermined amount of time, etc. It should be noted that the generated password can be sent to a server computer 104 for validation or validated locally. The password can be generated by concatenating the symbols from the innermost concentric layer to the outermost concentric layer, from the outermost concentric layer to the innermost concentric layer or from a predetermined order of concatenating concentric layer symbols.

Figure 3:
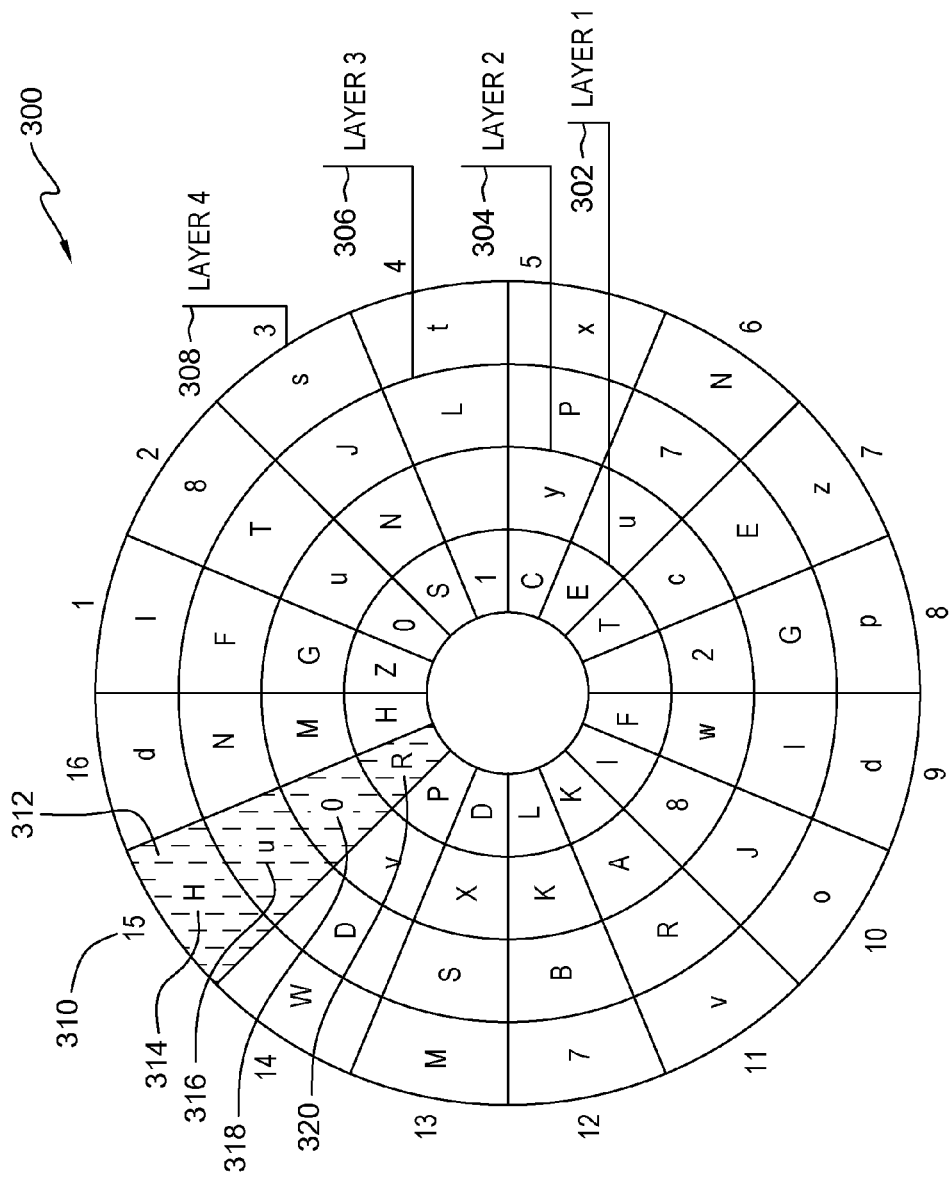
FIG. 3 illustrates a segmented multi-layer password validator, in accordance with an embodiment of the present invention.

FIG. 3 is an example of an embodiment of a segmented multi-layer password generation disk 300. The disk 300 comprises 4 concentric layers 302, 304, 306, 308 wherein each concentric layer 302, 304, 306, 308 is divided into 16 segments. It should be noted in the embodiment that each concentric layer bi-directionally rotates independently of any other concentric layer. Each segment of each concentric layer 302, 304, 306, 308 can contain a symbol. For example, a collection of segments 312 aligned across the concentric layers 302, 304, 306, 308 is denoted as a section. For the depicted embodiment there are 16 numbered sections wherein section fifteen 310 is depicted across the concentric layers as the section specifying the segments and their associated symbols used to generate the password. It should be noted that section fifteen 310 was preconfigured as the section selected for password generation.

In another aspect of the embodiment, the symbol positions, with respect to the segments on each concentric layer, are randomly shuffled each time a validation request is made, i.e., the layers must be aligned to place the symbols of the password in the correct section before another validation request can be made. The order of the symbols from the selected validation section can be configured, e.g., the example disk 300 assembles the password from the outer concentric layer to the inner concentric layer generating a password of "HuoR" for presentation to the validation component 208. Although this password is 4 symbols in length, a longer password can be required by configuring a greater number of concentric layers to the disk. Correspondingly, a greater number of symbols can be configured by increasing the number segments for the concentric layers.

Figure 4:
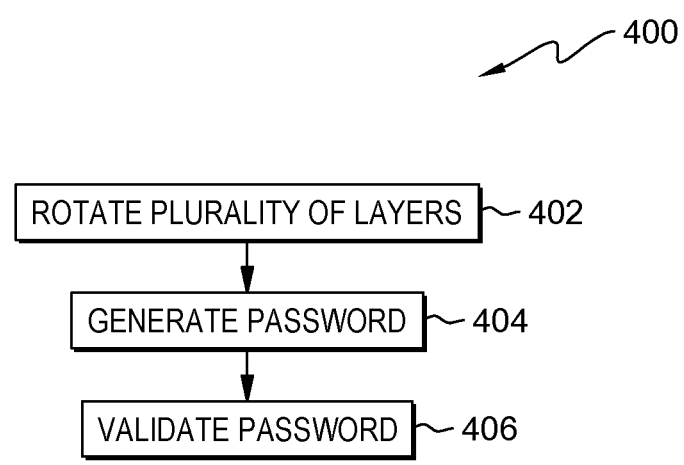
FIG. 4 is a flowchart depicting operational steps of a method for generating and validating a password, in accordance with an embodiment of the present invention.

FIG. 4 is a flowchart of a method 400 depicting operational steps to generate and validate a password based on a segmented multi-layer password generation disk 300. Looking to step 402, display component 204 displays the segmented multi-layer password generation disk 300 based on a predetermined configuration and input component 206 allows a user to rotate each concentric layer until the desired symbol of the each concentric layer is located within the preconfigured validation section.

Next, at step 404, the user initiates the collection of the symbols from the validation section to create the password. The order of assembly of the password from the symbols in the validation section is based on a predetermined configuration. The assembled password is then ready for validation.

Continuing at step 406, validation component 208 receives the generated password and compares the generated password to the previously stored validation password. It should be noted in the embodiment that the validation can occur either on the client computer 102 or on the server computer 104. If the generated password and the validation password match, then the user is granted access to the resource. After the validation is complete, the symbols of the concentric layers of the disk are shuffled so that no study of the sections is possible.

Figure 5:
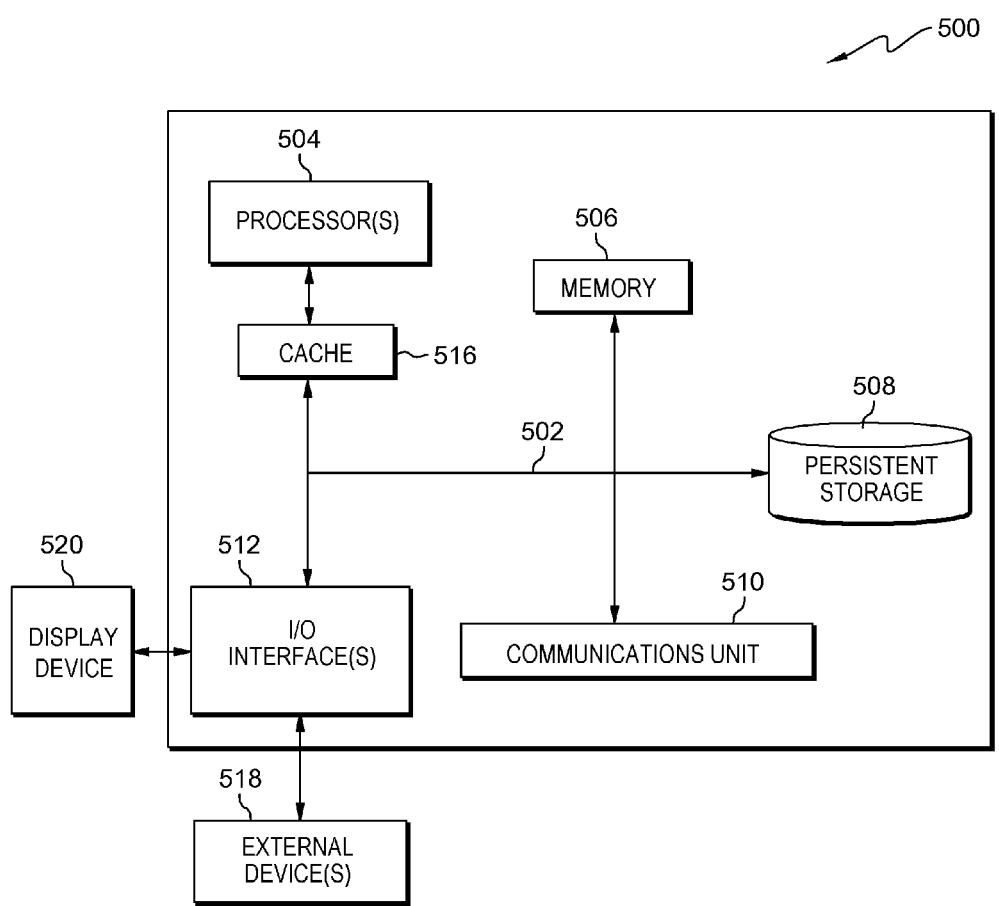
FIG. 5 is a block diagram of components of a prototype generation computer and a user prototype execution computer of an application prototype generation computing environment, in accordance with an embodiment of the present invention.

FIG. 5 depicts computer system 500, an example computer system representative of disruption indicator generation computer 102 and communication feeds computer 104. Computer system 500 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Computer system 500 includes processors 504, cache 516, memory 506, persistent storage 508, communications unit 510, input/output (I/O) interface(s) 512 and communications fabric 502. Communications fabric 502 provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of processors 504 by holding recently accessed data, and data near recently accessed data, from memory 506.

Program instructions and data used to practice embodiments of the present invention may be stored in persistent storage 508 and in memory 506 for execution by one or more of the respective processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Program instructions and data used to practice embodiments of the present invention may be downloaded to persistent storage 508 through communications unit 510.

I/O interface(s) 512 allows for input and output of data with other devices that may be connected to each computer system. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 also connect to display 520.

Display 520 provides a mechanism to display data to a user and may be, for example, a computer monitor.

The components described herein are identified based upon the application for which they are implemented in a specific embodiment of the invention. However, it should be appreciated that any particular component nomenclature herein is used merely for convenience, and thus the invention should not be limited to use solely in any specific application identified and/or implied by such nomenclature.

The present invention may be a system, a method and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality and operation of possible implementations of systems, methods, and computer program products according to various embodiments of the present invention. In this regard, each block in the flowchart or block diagrams may represent a module, segment or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for authenticating a user for resource access, the method comprising:
   displaying, by an authentication component, a plurality of independently bi-directionally rotating concentric layers configured with a plurality of segments wherein each of the plurality of segments contain a symbol;
   rotating, by the authentication component, based on user input, each of the plurality of concentric layers until a preconfigured symbol is aligned with a predetermined validation section;
   generating, by the authentication component, a password based on symbols aligned with the validation section wherein the validation section changes after each password generation based on the current hour of the day;
   validating, by the authentication component, the generated password based on matching the generated password to a predetermined password; and
   granting, by the authentication component, access to a resource associated with the predetermined password.

2. The method of claim 1, wherein there is a concentric layer for each symbol in the predetermined password.

3. The method of claim 1, wherein the symbol comprises upper case letters, lower case letters, numbers, spaces, pictographs and punctuation, associated with a plurality of languages.

4. The method of claim 1, wherein the generated password is assembled based on at least one of concatenating symbols from an innermost concentric layer to an outermost concentric layer, from the outermost concentric layer to the innermost concentric layer and from a predetermined order of concatenating concentric layer symbols.

5. The method of claim 1, wherein authenticating occurs on a client computer.

6. The method of claim 1, wherein authenticating occurs on a server computer.

7. The method of claim 1, wherein a number of segments per concentric layer is predetermined based on a user configured number of symbols per concentric layer.

8. A computer program product for authenticating a user for resource access, the computer program product comprising:
   one or more non-transitory computer readable storage media and program instructions stored on the one or more non-transitory computer readable storage media, the program instructions comprising:
   program instructions to display, by an authentication component, a plurality of independently bi-directionally rotating concentric layers configured with a plurality of segments wherein each of the plurality of segments contain a symbol;
   program instructions to rotate, by the authentication component, based on user input, each of the plurality of concentric layers until a preconfigured symbol is aligned with a predetermined validation section;
   program instructions to generate, by the authentication component, a password based on symbols aligned with the validation section wherein the validation section changes after each password generation based on the current hour of the day;
   program instructions to authenticate, by the authentication component, the generated password based on matching the generated password to a predetermined password; and
   program instructions to grant, by the authentication component, access to a resource associated with the predetermined password.

9. The computer program product of claim 8, wherein there is a concentric layer for each symbol in the predetermined password.

10. The computer program product of claim 8, wherein the symbol comprises upper case letters, lower case letters, numbers, spaces, pictographs and punctuation, associated with a plurality of languages.

11. The computer program product of claim 8, wherein the generated password is assembled based on at least one of concatenating symbols from an innermost concentric layer to an outermost concentric layer, from the outermost concentric layer to the innermost concentric layer and from a predetermined order of concatenating concentric layer symbols.

12. The computer program product of claim 8, wherein authenticating occurs on a client computer.

13. The computer program product of claim 8, wherein authenticating occurs on a server computer.

14. The computer program product of claim 8, wherein a number of segments per concentric layer is predetermined based on a user configured number of symbols per concentric layer.

15. A computer system for creating a disruption indicator based on communication feeds, the computer system comprising:
   one or more computer processors;
   one or more non-transitory computer readable storage media;
   program instructions stored on the one or more non-transitory computer readable storage media for execution by at least one of the one or more computer processors, the program instructions comprising:
   program instructions to display, by an authentication component, a plurality of independently bi-directionally rotating concentric layers configured with a plurality of segments wherein each of the plurality of segments contain a symbol;

program instructions to rotate, by the authentication component, based on user input, each of the plurality of concentric layers until a preconfigured symbol is aligned with a predetermined validation section;

program instructions to generate, by the authentication component, a password based on symbols aligned with the validation section wherein the validation section changes after each password generation based on the current hour of the day;

program instructions to authenticate, by the authentication component, the generated password based on matching the generated password to a predetermined password; and program instructions to grant, by the authentication component, access to a resource associated with the predetermined password.

16. The computer system of claim 15, wherein there is a concentric layer for each symbol in the predetermined password.

17. The computer system of claim 15, wherein the symbol comprises upper case letters, lower case letters, numbers, spaces, pictographs and punctuation, associated with a plurality of languages.

18. The computer system of claim 15, wherein the generated password is assembled based on at least one of concatenating symbols from an innermost concentric layer to an outermost concentric layer, from the outermost concentric layer to the innermost concentric layer and from a predetermined order of concatenating concentric layer symbols.

19. The computer system of claim 15, wherein authenticating occurs on at least one of a client computer and a server computer.

20. The computer system of claim 15, wherein a number of segments per concentric layer is predetermined based on a user configured number of symbols per concentric layer.

* * * * *